Figure 1:
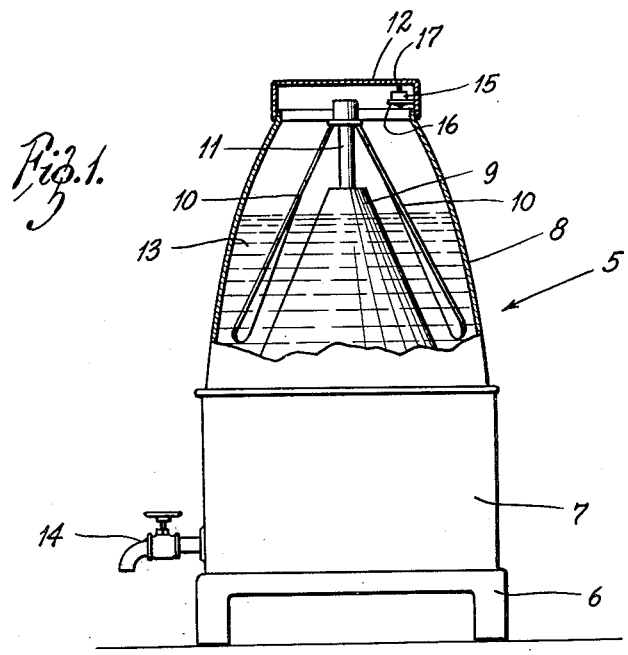

May 21, 1957   H. J. KELLER   2,793,125
METHOD OF PREVENTING DETERIORATION OF CITRUS JUICES
Filed Dec. 12, 1951

INVENTOR:
HERMAN J. KELLER,
BY Kingsland, Rogers & Ezell
ATTORNEYS

United States Patent Office 2,793,125
Patented May 21, 1957

2,793,125

METHOD OF PREVENTING DETERIORATION OF CITRUS JUICES

Herman J. Keller, Dunedin, Fla., assignor, by mesne assignments, to Brogdex Company, Orange County, Fla., a corporation of Florida Application December 12, 1951, Serial No. 261,167

8 Claims. (Cl. 99—155)

The present invention relates generally to the preservation of citrus juices, and more particularly to a method of inhibiting deterioration of citrus juices in dispensers to maintain palatability.

It is well known that citrus juices rapidly deteriorate and lose their fresh flavor and aroma when exposed to air at ambient temperatures such as from fifty degrees F. to eighty-five degrees F. and up. In the dispensing of citrus fruit juices, cooling to near the freezing point is resorted to to preserve the flavor and aroma of the juice for a sufficient number of hours to normally dispose of a predetermined amount of the juice. However, since the juice is not frozen, even maintaining it at a point near freezing is only effective for a limited number of hours, and it is necessary to wash the dispenser, or otherwise clean it, at the end of such period at which time any juice remaining in the machine must be discarded. Furthermore, many people desire citrus juice at temperatures more nearly approaching the ambient temperature of the room than approaching freezing, but dispensing juice at such temperatures commercially or at home is impractical in view of the fact that the juice loses its flavor and aroma so rapidly when not maintained quite cold. In home consumption, pitchers or glasses of citrus juices cannot be left long out of the refrigerator, or flavor and aroma are lost and the drink becomes unpalatable.

The present invention is a novel method of preventing deterioration and preserving the flavor and aroma of citrus juices at ambient and lower temperatures, and comprises the diffusion in the air over the juice of and the engagement of the surface of the citrus juice with a vapor or liquid which inhibits the development or growth of organisms causing the citrus juice to become unpalatable through loss of flavor and aroma. In juice dispensers, the atmosphere normally above the juice is diffused by or the liquid is covered by a film or layer of a vapor or gas which inhibits the development of the destructive bacteria or other organism without in anywise affecting the taste or aroma of the juice. Methylene chloride, sometimes called methylene dichloride or dichloromethane, and an admixture of ethylene dichloride and trichloroethane, for example, have been separately employed to satisfactorily inhibit the destructive organisms acting upon the juice, the vapor or gases of which diffuse throughout the air normally above the citrus juice in a dispenser, or other container. Suitable apparatus is employed to contain the inhibitor.

Therefore, an object of the present invention is to provide a novel method of preventing deterioration and preserving the flavor and aroma of citrus juices to overcome the existing difficulties surrounding commercial dispensing and domestic consumption of citrus juices.

Another object is to provide a novel method of preventing deterioration and preserving the flavor and aroma of citrus juices by blanketing the surface of the juice with a vapor which inhibits the development of organisms which destroy the fresh flavor and aroma of the juice.

Another object is to provide a novel method of preventing deterioration and preserving the flavor and aroma of citrus fruit juice which renders the consumption of citrus juice at ambient temperatures practical both commercially and in the home, and which is both inexpensive and simple to employ.

Figure 2:
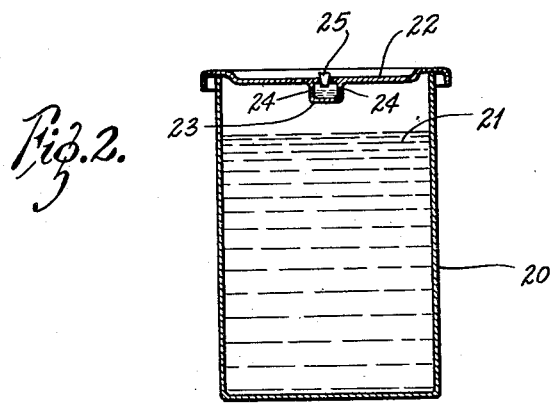

The foregoing and other objects and advantages are apparent from the following description, taken with the accompanying drawing, in which:

Fig. 1 is a diagrammatic side elevational view of a citrus fruit dispenser partly in vertical section, illustrating an adaptation of the present invention; and Fig. 2 is a diagrammatic vertical sectional view through a container and cover, illustrating another adaptation of the present invention.

In Fig. 1 of the drawing, there is diagrammatically illustrated a dspenser 5 for citrus juices, and the like, which is of the mechanically cooled type. A base 6 supports a housing 7 which encloses the usual mechanical refrigerating unit (not shown). On the housing 7 is a drink container 8, illustrated as of metal but which may be of glass, plastic or other material, which may have formed integral therewith a conical housing 9 for receiving a conical refrigeration coil (not shown). Stirrer blades 10 are mounted on a shaft 11 which is connected in the usual way to a motor (not shown) located in the housing 7. A removable cover 12 closes the container 8. Citrus fruit juice 13, or the like, is drawn from the container 8 by means of a faucet 14. Various forms of mechanically refrigerated dispensers 5 and other types of dispensers are used in the dispensing of citrus fruit juices, the temperature of the juice being maintained near freezing both to provide a cold drink and to retard the growth or development of organisms which effect juice deterioration and destroy the flavor and aroma of the juice. However, juices cannot be left in such dispensers for very long, since even the near freezing temperature of the juice appears only to slow down the development of destructive organisms rather than to hold the organisms in check indefinitely. Furthermore, many customers prefer their citrus juices not so cold, but it is presently impractical to dispense what may be termed a cool or relatively warm citrus fruit drink due in the main to the rapid development of the flavor and aroma destroying organisms.

The present invention contemplates the introduction into the atmosphere above the juice 13 of an inhibitor gas which actually checks the development of the flavor and aroma destroying organisms for predetermined periods of time and which is as effective with warm as with quite cold citrus juice. One effective inhibitor is an admixture of two parts by weight of ethylene dichloride and one part by weight of trichloroethane which can be handled as a liquid but which vaporizes at even below thirty degrees F. When it is desired to dispense the citrus juice at or near ambient temperature, the aforesaid inhibitor may be readily applied by placing a small quantity of the admixture in a small container 15 removably mounted on a bracket 16 secured to the inside flange of the cover 12, as shown in Fig. 1. A wick 17 extends from the container 15. The admixture will travel up the wick 17 in the well-known manner and will evaporate into the space above the citrus juice 13 to establish a sterilizing blanket for the surface of the juice 13. For an average citrus juice dispenser, 1 cc. of the admixture vaporized above a charge of juice is adequate. Destructive organisms in the air are positively checked in their harmful action by the above-mentioned admixture for an indefinite period of time running into a number of days, but from twenty-four to forty-eight hours protection are sufficient. No off flavor is imparted to the citrus juice by the above-mentioned admixture.

Only a very small amount of the vaporized admixture is required to inhibit the growth of the destructive organisms. Both ethylene dichloride and trichloroethane may be used separately. About 1 cc. of either for an average size dispenser is adequate.

Where the temperature within the container 8 is below the temperature of vaporization of the particular inhibitor employed, vaporization may be effected by small electrical flasher plates, or the like, to accomplish the desired organism inhibiting result. There may be periodic flashing of a small portion of the inhibitor, the ultimate presence of some of which in the juice 13 is neither distasteful nor harmful to the consumer.

In fact, a further adaptation of the present invention includes the addition to the citrus juice of a small amount of liquid inhibitor, such as triethylene glycol, which is an active inhibitor having a high temperature of vaporization but which is exceedingly effective when thus added directly to the citrus juice. For effective use, 2 cc. of triethylene glycol are added to 1 gallon of juice. Various ways may be employed to effect the addition of this inhibitor to the juice.

A still further adaptation of the present invention is the employment of methylene chloride which is odorless and without flavor and is a very effective inhibitor of the development of destructive organisms in citrus fruit juices. Methylene chloride may be introduced above the citrus juice in a dispenser, such as dispenser 5, in the same manner and quantity as the admixture described above. A small vial may be employed to hold the inhibitor in place of the container 15, if desired, a similar wick being used to permit evaporation of the inhibitor. In the case of a juice dispenser, only a very small amount of the methylene chloride is required in the space above the juice in order to check the destructive organisms.

In Fig. 2 of the drawing, there is diagrammatically shown a vessel 20 containing citrus juice 21 which represents any kind of a pitcher from which citrus juice may be poured. In home use of citrus juices, it is often highly desirable to provide the citrus juice in a pitcher or other container for individual consumption over a period of hours, either informally in the home or during some lengthy function. However, as is pointed out above, at room temperatures of fifty degrees F. and up, citrus juice quickly loses flavor and aroma and becomes highly unpalatable in a matter of several hours or even less under unfavorable climatic circumstances. The present invention contemplates overcoming this undesirable situation by inhibiting the organisms which destroy the aroma and flavor of the citrus juice.

In Fig. 2, a cover 22 is provided which has a depending well 23 in which is located a suitable inhibitor such as the above-mentioned admixture of ethylene dichloride and trichloroethane, or methylene chloride. Small apertures 24 are formed in the well 23 to provide for escape from the well of vapors or gases into the space above the juice 21, the mentioned inhibitors evaporating at normal room temperatures. A closed stopper 25 closes an opening through which the inhibitor may be poured into the well 23. The escaping gases will, in effect, sterilize the atmosphere in contact with the citrus juice 21 and the juice surface so that the citrus juice will remain fresh and aromatic for forty-eight hours or longer. The inhibitor gas will diffuse throughout the space above the juice 21 adequately rapidly in view of the fact that the gas of the two inhibitors mentioned and of other inhibitors is heavier than air and will encounter less resistance in the diffusion process. Particularly in respect to the sterilization of a pitcher, or the like, of citrus juice which is intended to be consumed during a period of from several to a dozen or so hours, it is not essential to the complete success of the present method of maintaining the juice fresh and palatable for the cover 22 to maintain a sealing relation with the container 20. However, the portion of the cover 22 which contacts the container 20 may be of deformable material, if desired, in order to insure rapid initial sterilization of the juice. Obviously, the cover 22 may be of any form or configuration and the well 23 may be replaced by a vial with wick or a container unit of some shape with wick or apertures.

It is clear from the foregoing description of several adaptations of the present invention that the instant novel method of inhibiting the development or growth of destructive organisms in citrus juices, which destroy flavor and aroma and otherwise render the juice unpalatable, may be successfully and effectively applied through various mechanical media of standard or novel construction per se.

The method of inhibiting decay in fresh fruits and vegetables by subjecting the same to an atmosphere containing methylene chloride gas in predetermined concentration and for a predetermined time is a further novel extension of the inventions disclosed and claimed herein and in the applicant's copending applications, Serial No. 252,581, filed October 22, 1951, and Serial No. 253,232, filed October 25, 1951. Substantially five quarts are used per carload of fruit, which, when applied as taught in the just-identified applications, inhibit decay causing organisms for from eight to twelve days. In laboratory tests, one and a half to three cubic centimeters in a six gallon can with a dozen oranges, for example, inhibit decay organisms at room temperature for from eight to twelve days.

A further extension of the inventions disclosed herein and in the applicant's above-identified applications is the novel method of inhibiting decay in fresh fruits and vegetables by subjecting the same to an atmosphere containing triethylene glycol in predetermined concentration and for a predetermined time. In laboratory tests, from three to five drops of triethylene glycol were vaporized on small hot plates insulatively disposed in five gallon containers holding fifteen peaches each, and both the check and gassed containers were substantially sealed for the first twenty-four hours before being opened to room temperature of seventy degrees F. average. For the gassed fruit lots, an average of one peach showed decay at the end of five days from the start of the test, and an average of two peaches showed decay at the end of nine days. The average of the checks, same test conditions, but no treatment, showed seven peaches with decay at five days, and twelve at nine days.

The novel admixture of substantially one part ethylene dichloride (ED), one part propylene dichloride (PD), and one part trichloroethane (T), all by liquid weight, is an excellent inhibitor of decay causing organisms in perishable fruits and other fresh foods. The method of inhibiting decay in fresh fruits and other fresh foods by subjecting the same to an atmosphere containing said novel admixture in predetermined concentration and for a predetermined time is a further extension of decay inhibiting methods herein and in applicant's two above-identified copending applications. This method is effected using substantially the same amounts of the admixture and following the same steps for decay control as in the decay inhibiting method using the admixture of two parts ethylene dichloride and one part trichloroethane disclosed in said first-mentioned copending application. An average of tests using this one-one-one admixture conducted in October 1950, at Dunedin, Florida, using six gallon containers and lots of fifteen apples, room temperature, the admixture being permitted to evaporate in the containers, all containers being substantially sealed for the first twenty-four hours and then opened and the fruit placed in another container, showed:

| Amount | 5 days | 10 days | 15 days |
| --- | --- | --- | --- |
| PD(1)-ED(1)-T(1) Gas 2 cc | No decay, all good. | No decay, all good. | 1 decay, 14 good. |
| Checks | No decay. | 2 decays, 13 good. | 5 decays, 10 good. |

The disclosed admixture of two parts ethylene dichloride (ED) and one part trichloroethane (T) by liquid weight finds wide application in the novel decay inhibiting methods of the applicant's present and two above-identified copending applications. Likewise, an admixture of equal parts of ethylene dichloride (ED) and trichloroethane (T) is used successfully as a further novel extension of said decay inhibiting methods. An admixture of two parts ethylene dichloride and one part carbon tetrachloride may be used and in substantially the same quantities as the first admixture of this paragraph, although it should not be used on waxed fruit. Laboratory tests conducted at Dunedin, Florida, during 1950–51, using six gallon cans and lots of fresh fruits as specified, room temperature, the admixture of two parts ethlenye dichloride and one part trichloroethane being permitted to evaporate in the cans, each can both gassed and check being substantially sealed for the first twenty-four hours and then opened and the contents placed in another container in the room, showed:

TEST 1.—APPLES—15 EACH CAN—TIMED FROM START

|  | Amount | 7 days | 14 days |
|---|---|---|---|
| ED(2)-T(1) | 1 cc | 0 decay, all good | 1 decay, 14 good. |
| ED(2)-T(1) | 1½ cc | do | Do. |
| Check |  | 2 decay, 13 good | 5 decay, 10 good. |

TEST 2.—APPLES—15 EACH CAN—TIMED FROM START

|  | Amount | 5 days | 10 days | 15 days |
|---|---|---|---|---|
| ED(2)-T(1) | 1½ cc | No decay, all good. | No decay, all good (15). | 1 decay, 14 good. |
| Check |  | do | 3 decay, 12 good. | 5 decay, 10 good. |

The method of inhibiting decay in fresh peaches and other fresh foods by subjecting the same to an atmosphere containing trichloroethane in predetermined concentration and for a predetermined period is a further extension of the applicant's novel decay inhibiting methods as disclosed herein and in his two above-identified copending applications. Typical tests of a laboratory series at Dunedin, Florida, summer temperatures, using six gallon cans for both gassed and check fruit which were sealed for the first twenty-four hours and then opened and the fruit placed in open containers in the room, the trichloroethane being placed in the cans at the start of the tests in liquid form and permitted to evaporate, showed the following results:

TEST NO. 1.—20 ELBERTA PEACHES (GEORGIA) JULY 1951

|  | 2 days | 3 days | 4 days | 5 days |
|---|---|---|---|---|
| 1½ cc. Trichloroethane | 20 good, no rots. | 20 good, no rots. | 20 good, no rots. | 18 good, 2 rots. |
| Checks—no treatment | 17 good, 3 rots. | 15 good, 5 rots. | 13 good, 7 rots. | 8 good, 12 rots. |

TEST NO. 2.—24 ELBERTA PEACHES (GEORGIA)— JULY 1951

|  | 2 days | 3 days | 4 days | 5 days |
|---|---|---|---|---|
| 1½ cc. Trichloroethane | 24 good, no rots. | 22 good, 2 rots. | 21 good, 3 rots. | 21 good, 3 rots. |
| Check—no treatment | 20 good, 4 rots. | 14 good, 10 rots. | 14 good, 10 rots. | 7 good, 17 rots. |

TEST NO. 3.—26 ELBERTA PEACHES (SOUTH CAROLINA)—AUGUST 1951

|  | 2 days | 3 days | 4 days | 5 days |
|---|---|---|---|---|
| 1½ cc. Trichloroethane | 26 good, no rots. | 26 good, no rots. | 25 good, 1 rot. | 25 good, 1 rot. |
| Check | 24 good, 2 rots. | 22 good, 4 rots. | 18 good, 8 rots. | 14 good, 12 rots. |

A further novel extension of the applicant's organism inhibiting developments is the method of inhibiting decay in fresh fruits and the like by subjecting the same to an atmosphere including perchloroethylene, or trichloroethylene, or an admixture of perchloroethylene and trichloroethane or trichloroethylene and trichloroethane in predetermined concentration and for a predetermined length of time. As in the disclosure of the applicant's copending application Serial No. 252,581, filed October 22, 1951, the present method contemplates evaporation of the material in the presence of the fresh fruit and the like in a closed area which is usually maintained closed for about twenty-four hours, opening thereof then depending upon the treated subject matter, manner of handling, and other factors.

It is apparent that there have been provided a novel method of and apparatus for inhibiting the growth or development of destructive organisms in citrus fruit juices which fulfill the objects and advantages sought therefor.

It is to be understood that the foregoing description has been given by way of illustration and example. It is also to be understood that substitution of equivalent steps and rearrangement of steps, which will be readily apparent to one skilled in the art, are contemplated as within the scope of the present invention which is limited only by the claims which follow.

What is claimed is:

1. A method of inhibiting the development in citrus fruit juice of organisms which render it unpalatable comprising the steps of introducing an organism inhibitor gas into the atmosphere above the juice, and permitting the inhibitor gas to check the growth of the organisms destructive to the palatability of the juice, said gas comprising at least one member of the group consisting of ethylene dichloride, trichloroethane, triethylene glycol, methylene chloride, propylene dichloride, carbon tetrachloride, perchloroethylene and trichloroethylene.

2. A method of inhibiting the development in citrus fruit juice of organisms which render it unpalatable comprising the steps of providing a quantity of liquid organism inhibitor in a closed space above the surface of the juice evaporatable at a temperature below that of the atmosphere above the juice, and permitting the inhibitor to evaporate at a predetermined rate and the gas to pass into the closed space above the juice and to check the growth of the organisms to prevent rendering the juice unpalatable for consumption, said gas comprising a member of the group consisting of ethylene dichloride and trichloroethane; triethylene glycol; methylene chloride; ethylene dichloride, propylene dichloride and trichloroethane; ethylene dichloride and carbon tetrachloride; trichloroethane; ethylene dichloride; perchloroethylene; perchloroethylene and trichloroethane; trichloroethylene; and, trichloroethylene and trichloroethane.

3. A method of inhibiting in citrus fruit juice being dispensed from a container the development of organisms which render it unpalatable for human consumption comprising the step of introducing a small amount of liquid triethylene glycol directly into the juice.

4. A method of inhibiting in citrus fruit juice being dispensed from a container the development of organisms which render it unpalatable for human consumption comprising the step of introducing methylene chloride into the atmosphere above the juice and into contact with the juice in sufficient quantity to inhibit development of such organisms.

5. A method of inhibiting in citrus fruit juice being dispensed from a container the development of organisms which render it unpalatable for human consumption comprising the step of introducing ethylene dichloride into the atmosphere above the juice and into contact with the juice in sufficient quantity to inhibit development of such organisms.

6. A method of inhibiting in citrus fruit juice being dispensed from a container the development of organisms which render it unpalatable for human consumption comprising the step of introducing trichloroethane into the atmosphere above the juice and into contact with the juice in sufficient quantity to inhibit development of such organisms.

7. A method of maintaining citrus fruit juice palatable for human consumption comprising the step of inhibiting the development and growth of flavor and aroma destroying organisms by contacting the juice with an effective inhibitor agent consisting of ethylene dichloride and trichloroethane.

8. The method of maintaining citrus fruit juice palatable for human consumption as defined in claim 7 in which the effective inhibitor agent is added directly to the juice as a liquid.

References Cited in the file of this patent

UNITED STATES PATENTS

| | | |
|---|---|---|
| 672,994 | Wacker | Apr. 30, 1901 |
| 1,958,232 | Burkart | May 8, 1934 |
| 2,076,459 | Hanson | Apr. 6, 1937 |
| 2,179,327 | Evans | Nov. 7, 1939 |
| 2,249,262 | Thomas | July 15, 1941 |
| 2,324,471 | Allen et al. | July 20, 1943 |
| 2,324,472 | Allen et al. | July 20, 1943 |
| 2,354,014 | Haines | July 18, 1944 |
| 2,425,238 | Fletcher et al. | Aug. 5, 1947 |
| 2,460,710 | Nolan et al. | Feb. 1, 1949 |
| 2,474,226 | Coleman et al. | June 28, 1949 |
| 2,522,535 | Pryor | Sept. 19, 1950 |
| 2,577,421 | Keller | Dec. 4, 1951 |
| 2,755,188 | Keller | July 17, 1956 |